Figure 1:
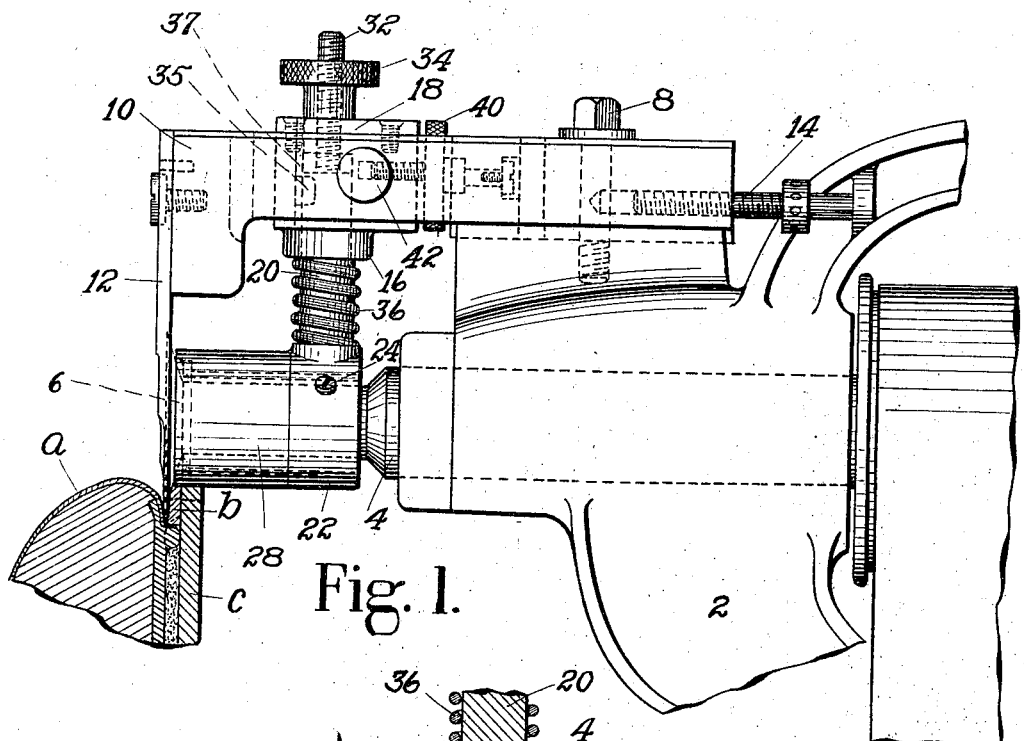

C. K. MacDONALD.
TRIMMING MACHINE.
APPLICATION FILED NOV. 4, 1915.

1,235,709.

Patented Aug. 7, 1917.

INVENTOR

UNITED STATES PATENT OFFICE.

CLIFFORD K. MacDONALD, OF BROCKTON, MASSACHUSETTS, ASSIGNOR TO UNITED SHOE MACHINERY COMPANY, OF PATERSON, NEW JERSEY, A CORPORATION OF NEW JERSEY.

TRIMMING-MACHINE.

1,235,709.   Specification of Letters Patent.   Patented Aug. 7, 1917.

Application filed November 4, 1915. Serial No. 59,594.

*To all whom it may concern:*

Be it known that I, CLIFFORD K. MAC-DONALD, a citizen of the United States, residing at Brockton, in the county of Plymouth and State of Massachusetts, have invented certain Improvements in Trimming-Machines, of which the following description, in connection with the accompanying drawings, is a specification, like reference characters on the drawings indicating like parts in the several figures.

This invention relates to trimming machines such as are used in the manufacture of boots and shoes, and is of particular utility as applied to a machine which is used in shoe manufacture for making a slight cut or bevel along the margin of the upper surface of the welt in a welt shoe prior to the final edge trimming operation upon the sole and the welt. The invention is therefore illustrated herein in its application to this machine; but it will be readily understood from a consideration of the construction hereinafter described that the invention in its broader aspects is not limited to machines for performing this particular operation upon a shoe.

In cutters such as are commonly used for performing the final edge trimming operation upon shoe soles the teeth are provided with slight projections in the form of lips adapted to make a slight bevel at the upper corner of the sole or welt edge so as to insure a clean cut across the edge and thus improve the appearance of the shoe. The cut made by these lips should in no case extend inward far enough to injure the sole attaching stitches; and it is desirable both for this reason and for the sake of the final appearance of the edge that the cut should be as small as possible consistent with the object in view. It is found, however, that after the attachment of the sole to the welt by the usual row of stitches that are located at some distance inwardly from the edge, the upper surface of the welt at its outer edge is likely to be somewhat uneven and not precisely parallel at all points to the surface of the sole. In view of this condition it is frequently necessary, in order to make a clean cut in trimming the edge, to extend the lip of the edge trimming cutter farther than would otherwise be required, with the result that the bevel formed by the lips is deeper than is desirable. It is the practice, therefore, particularly in the manufacture of the best shoes, to trim the upper surface of the welt at its outer edge prior to the final edge trimming operation so as to present an even surface to the lips of the edge trimming cutter and thus permit a clean cut to be made at the upper corner of the welt edge without the necessity of using a cutter in which the beveling projections or lips are unduly large. A type of machine commonly used for this purpose includes a cutter having cutting edges formed upon a substantially conical end face next to the shaft upon which the cutter is mounted, together with means for controlling the extent or depth of the cut comprising a collar secured to the shaft adjacent to the conical face of the cutter and arranged to engage the sole edge to guide the shoe as it is turned to bring different portions of the welt into the field of operation of the cutter.

In the use of a welt trimming machine of this construction it has been found that the work guiding collar, which rotates with the cutter shaft in a direction opposite to that in which the shoe is moved by the operator, renders it difficult for the operator to control the position of the shoe. It is, moreover, desirable at times to vary the extent or depth of the cut, since on different shoes or styles of shoes the distance between the edge of the sole and the line of stitches may vary and it is necessary in all cases to insure against cutting inward as far as the stitches. On the machines in use heretofore such variation could be effected only by changing the work guiding collar on the cutter shaft and substituting a collar of different size. In view of the fact that such change necessitates the removal of portions of the machine, including the cutter, the time and trouble involved have heretofore rendered it impracticable to adjust the machine for relatively small variations in the character of the work.

It is an important object of this invention to improve the work guiding means in machines of the above described character so as to avoid the difficulties heretofore encountered in the use of such machines. To this end a feature of the invention consists in a novel and improved construction of work guiding means arranged to permit quick adjustment for varying the extent or depth of the cut. The invention provides, also, a work engaging guide member which is independent of the rotation of the cutter shaft, and in the preferred construction shown this member comprises a roll which is free to be turned by the work as the latter is moved in engagement with it. This construction serves to facilitate the manipulation of the work and constitutes a further important feature of the invention.

The above and other features of the invention, including certain details of construction and combinations of parts, will now be described with reference to the accompanying drawings and pointed out in the claims.

In the drawings,—

Figure 3:
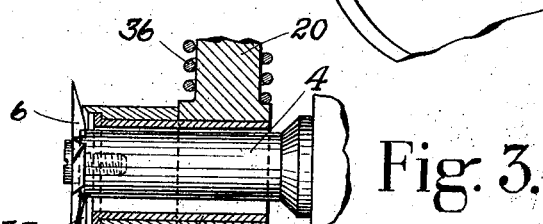
Figure 2:
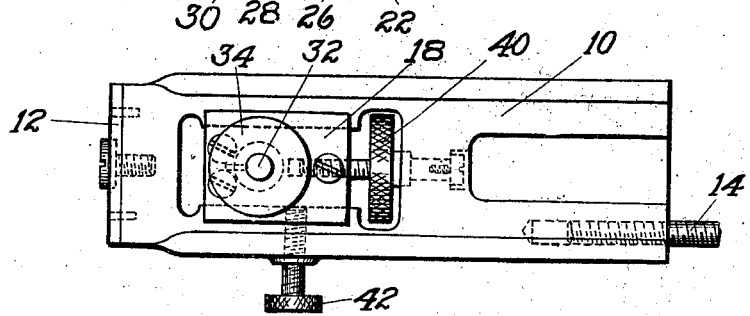

Figure 1 is a front elevation of the upper portion of a machine in which the invention is embodied, Fig. 2 is a plan view of a portion of the mechanism shown in Fig. 1, and Fig. 3 is a vertical section through the work guide and parts of the mechanism associated therewith.

Mounted in bearings in the frame 2 of the machine is a rotary shaft 4 upon the reduced outer end of which is secured a cutter 6 provided with cutting teeth upon its conical end face next to the shaft. Clamped upon the frame 2 by means of a screw 8 is a bracket 10 upon the outer end of which is secured a depending cutter shield or guard 12 provided, as usual, on the side next to the cutter with a slight depression in which the larger end of the cutter is received in close relation to the guard so as to protect the upper of the shoe from contact with the cutter. This guard, in the operation of the machine, is positioned in the crease between the upper and the welt of the shoe and thus serves also to determine the position of the shoe longitudinally of the cutter axis. The bracket 10 is slidably mounted upon the frame 2 for adjustment longitudinally of the shaft 4, and in order to facilitate precise adjustment of the bracket so as to position the guard 12 in the desired close proximity to the cutter, the machine includes an adjusting screw 14 one end of which is seated in a bearing in the frame 2, while the other end is threaded for engagement in a threaded bore in the bracket. After the bracket has been adjusted it may be securely clamped in position by the screw 8.

The bracket 10 is provided near its outer end with a vertical opening in which is mounted a block 16 flanged at its lower side to overlap portions of the bracket adjacent to the opening and having secured upon its upper side a plate 18 which similarly overlaps portions of the top surface of the bracket, as shown in Fig. 2. The block 16 and the plate 18 are bored vertically to receive a rod 20 which terminates at its lower end in an eye 22 through which the reduced portions of the shaft 4 extends, the diameter of the opening in the eye being considerably greater than that of the reduced portion of the shaft. Secured by a set screw 24 within the opening in the eye 22 is a cylindrical bearing member 26, larger in internal diameter than the reduced portion of the shaft and supporting upon its outer end portion a work engaging guide member 28. The guide 28 is freely rotatable on the bearing 26 and is retained in position by means of a flange 30 on the outer end of the bearing. The rod 20 at its upper end is reduced and threaded, as shown at 32, to receive a nut 34 which bears upon the plate 18, and a spring 36 encircling the rod between the block 16 and the eye 22 tends to move the rod downwardly and thus to maintain the nut 34 firmly in engagement with the plate 18. A key 35 slidable in a groove 37 in the block 16 serves to prevent the rod 20 from turning.

It will be seen that the block 16 and the plate 18 constitute a slide which is movable lengthwise of the opening in the bracket 10 in parallel relation to the cutter shaft so as to adjust the guide 28 longitudinally of the shaft and position the end of the guide in close proximity to the working face of the cutter in any position of transverse adjustment of the guide. In order that the guide may present an extended bearing surface in engagement with the work it is desirable that it be positioned as closely as possible to the cutter, and in order to facilitate such adjustment it is provided on the end adjacent to the cutter with a beveled inner edge, as shown at 38. For the purpose of adjusting the guide lengthwise of the shaft a thumb screw 40 is provided, this screw having one end portion seated in a bearing in the bracket 10 and its opposite end threaded for engagement in a threaded bore in the block 16. The block 16 may be retained securely in any position to which it is adjusted by the screw 40 by means of a set screw 42 which is threaded in the bracket 10 and arranged to bear at it inner end against the block.

In the operation of the machine the shoe is presented as shown in Fig. 1 with the guard 12 in the crease between the upper $a$ and the welt $b$ and with the edge of the sole $c$ and a portion of the edge of the welt in engagement with the guide 28. A portion of the cutter 6 which is exposed between the guide 28 and the guard 12 will then operate upon the upper surface of the welt at its edge, and as the shoe is turned to bring different portions of the work into the field of operation of the cutter, the latter will trim the margin of the upper surface of the welt evenly upon a slight bevel and thus prepare the shoe for effective and uniform treatment by the edge trimming cutter. As the shoe is thus moved, the engagement of the edge of the sole with the guide 28 will cause the guide to turn upon the bearing 26, which will greatly facilitate the manipulation of the shoe.

The guide 28 should be adjusted with reference to the projection of the sole beyond the sole attaching stitches to cause the bevel on the welt to terminate outside of the line of these stitches. This adjustment is effected simply by manipulating the nut 34, the screw 40 also being turned to position the guide as closely as possible to the cutter in any position of its transverse adjustment effected by the nut 34. After adjustment of the block 16 by means of the screw 40, the screw 42 may be tightened to insure against any change in the adjustment through accidental contact with the screw 40 or through the vibration of the machine. Change in the vertical adjustment of the guide from similar causes is effectively prevented by the frictional engagement of the nut 34 with the plate 18 under the pressure of the spring 36.

Having described the invention, what I claim as new and desire to secure by Letters Patent of the United States is:—

1. In a machine of the class described, the combination with a rotary shaft and a cutter mounted on the shaft and provided with an end face adapted to form a bevel on the upper surface of a welt in a shoe, of a guide arranged to engage the edge of the shoe sole to control the depth of said bevel, said guide being adjustable transversely of the shaft to vary the depth of the bevel and adjustable also longitudinally of the shaft to permit it to assume a position in close proximity to the working face of the cutter in any position of said transverse adjustment.

2. In a machine of the class described, the combination with a rotary shaft and a cutter mounted on the shaft and provided with a conical end face adapted to form a bevel on the upper surface of a welt in a shoe, of a guide encircling the shaft and arranged to engage the edge of the shoe sole to control the depth of said bevel, said guide being adjustable both transversely and longitudinally of the shaft and having a beveled end surface to permit it to be positioned in close proximity to the cutter.

3. In a machine of the class described, the combination with a rotary shaft and a welt beveling cutter mounted on the shaft, of a guide extending around the shaft adjacent to the cutter and arranged to engage the edge of the work to control the depth of the bevel on the welt, said guide having an enlarged opening to permit it to be adjusted transversely of the shaft, means for effecting said adjustment of the guide, and means for adjusting the guide also longitudinally of the shaft to position it in close relation to the cutter in any position of said transverse adjustment.

4. In a machine of the class described, the combination with a rotary shaft and a welt beveling cutter mounted on the shaft, of a guide extending around the shaft adjacent to the cutter and arranged to engage the edge of the work to control the depth of the bevel on the welt, said guide having an enlarged opening to permit it to be adjusted transversely of the shaft, means for effecting said adjustment of the guide, and means for retaining the guide in any position to which it is adjusted.

5. In a machine of the class described, the combination with a rotary shaft and a cutter mounted on the shaft and arranged to bevel the welt of a shoe, of a guide arranged to engage the edge of the shoe sole to control the depth of the bevel on the welt, said guide being adjustable both transversely and longitudinally of the shaft.

6. In a machine of the class described, the combination with a rotary shaft and a cutter mounted on the shaft, of a guide encircling the shaft and comprising a roll arranged to turn in contact with the work, said guide having an opening of greater diameter than the shaft to permit it to be adjusted transversely of the shaft.

7. In a machine of the class described, the combination with a rotary shaft and a cutter mounted on the shaft, of a guide comprising a roll arranged to turn in contact with the work, said roll being adjustable transversely of the shaft to vary the depth of the cut and adjustable also longitudinally of the shaft to position it in close relation to the cutter in any position of said transverse adjustment.

8. In a machine of the class described, the combination with a rotary shaft and a cutter mounted on the shaft, of a bearing member encircling the shaft and having an opening of larger diameter than the shaft to permit it to be adjusted transversely of the shaft, and a roll rotatable upon said member adjacent to the cutter, said roll being arranged to act as a guide for the work and to be turned by contact with the work.

9. In a machine of the class described, the combination with a rotary shaft and a cutter mounted on the shaft and provided with an end face adapted to form a bevel on the upper surface of a welt in a shoe, of a bearing member encircling the shaft and having an opening of larger diameter than the shaft to permit it to be adjusted transversely of the shaft, and a roll rotatable upon said member adjacent to the cutter, said roll being arranged for engagement with the edge of the shoe sole to control the depth of the bevel on the welt and to be turned by the work as the latter is moved to transfer the point of operation of the cutter along the welt.

10. In a machine of the class described, the combination with a rotary shaft and a cutter mounted on the shaft, of a slide movable at one side of the shaft longitudinally thereof, a rod longitudinally adjustable in the slide and extending toward the shaft, a bearing member carried by said rod and encircling the shaft, said member having an opening of greater diameter than the shaft through which the shaft extends, and a roll mounted upon said bearing member in position to engage the work adjacent to the cutter.

11. In a machine of the class described, a rotary shaft having a beveled cutter on its end, the bevel being turned toward the shaft, and a guide arranged adjacent the bevel to be contacted by the edge of a sole presented to the cutter, said guide being adjustable transversely of the shaft to control the depth of bevel.

In testimony whereof I have signed my name to this specification.

CLIFFORD K. MacDONALD.

Copies of this patent may be obtained for five cents each, by addressing the "Commissioner of Patents, Washington, D. C."